Patented Jan. 7, 1941

2,227,543

UNITED STATES PATENT OFFICE 2,227,543

WATER-SOLUBLE ANTHRAQUINONE DYESTUFFS AND A PROCESS FOR THEIR MANUFACTURE

Ernst Gutzwiller, Basel, Switzerland, assignor to Sandoz, Ltd., Basel, Switzerland No Drawing. Application June 28, 1938, Serial No. 216,347. In Switzerland July 13, 1937

15 Claims. (Cl. 260—364)

The present invention relates to new water-soluble anthraquinone dyestuffs which dye animal fibres from an acid bath fast yellow, orange, brown to grey shades of excellent fastness properties, especially with an excellent fastness to acid milling.

According to the present invention the new water-soluble anthraquinone dyestuffs can be obtained by treating with sulphonating agents anthraquinone compounds of the general formula

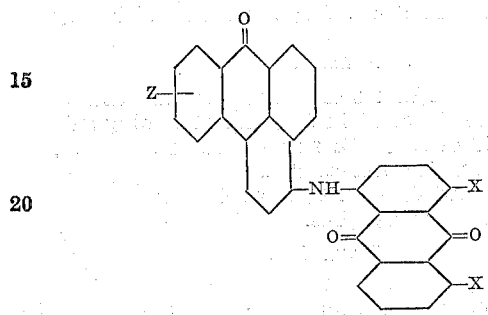

wherein one of the X's represents hydrogen, amino, alkylamino, hydroxyalkylamino and arylamino groups, the other X being hydrogen, and in the case that X represents an arylamino group, this may contain substituents such as alkyl, halogen, amino, arylamino and acylamino groups, and wherein Z represents hydrogen or halogen.

The sulphonation of the above cited anthraquinone compounds is carred out with the usual sulphonating agents, preferably with fuming sulphuric acid containing 5 or more per cent of sulphur trioxide or with chlorosulphonic acid and at temperatures of 20–150° C. Sometimes it is advantageous to carry out the sulphonation in presence of boric acid or of metal salts such as mercury sulphate, sodium sulphate or potassium sulphate.

The end point of the sulphonation is ascertained by taking out a sample and controlling its solubility in water. The dyestuffs are isolated in the usual manner by pouring the sulphonation mass on ice or water and by subsequent filtration and neutralization.

The dyestuffs thus obtained possess the following general formula

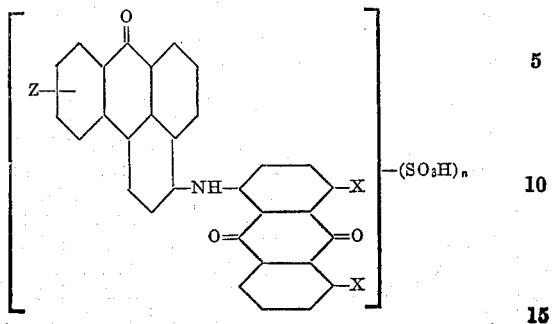

wherein $n$ represents a whole number, Z represents halogen or hydrogen and one of the X's represents hydrogen, amino, alkylamino, hydroxyalkylamino and arylamino groups, the other X being hydrogen, and in the case that X represents an arylamino group, this may contain substituents such as alkyl, halogen, amino, arylamino and acylamino groups. They dye, as it has been said above, animal fibres yellow, orange, brown or grey shades of excellent fastness properties.

One object of the present invention is the process for the manufacture of water-soluble anthraquinone dyestuffs, comprising sulphonating anthraquinone compounds of the general formula

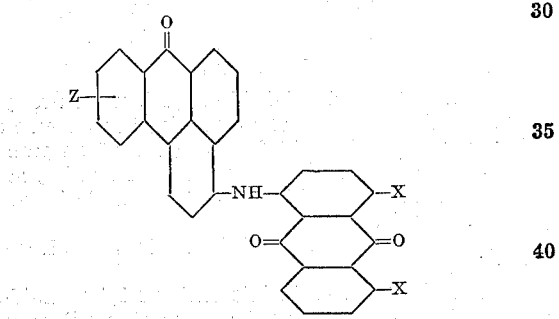

wherein one of the X's represents hydrogen, amino, alkylamino, hydroxyalkylamino and arylamino groups, the other X being hydrogen, and in the case that X represents an arylamino group, this may contain substituents such as alkyl, halogen, amino, arylamino and acylamino groups, and wherein Z represents halogen or hydrogen, preferably at temperatures of 20 to 150° C. and in presence of boric acid or of metal salts.

Other objects of the present invention are the new water-soluble dyestuffs of the general formula

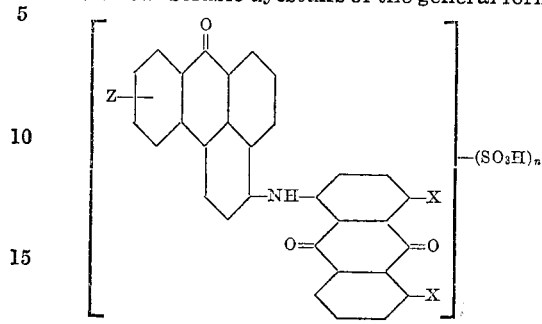

wherein $n$ represents a whole number, Z is hydrogen or halogen and one of the X's represents hydrogen, amino, alkylamino, hydroxyalkylamino and arylamino groups, the other X being hydrogen, and in the case that X represents an arylamino group, this may contain substituents such as alkyl, halogen, amino, arylamino and acylamino groups.

Further objects will appear hereinafter.

The following examples, without being limitative, illustrate the present invention, the parts being by weight:

*Example 1*

5 parts of 1,4-anilido-Bz-1-benzanthronylaminoanthraquinone, obtained by condensation of 1,4-aminoanilidoanthraquinone with Bz-1-halogenbenzanthrone, are treated with 40 parts of fuming sulphuric acid of 10–50% $SO_3$ at 40–80° C., until a test shows that the starting product became completely water-soluble. The dyestuff is isolated by pouring the sulphonation mass into ice or water. It dyes wool beautiful reddish-grey shades of excellent fastness. If the sulphonation is carried out at higher temperature, a dyestuff with a more bluish shade will be obtained.

*Example 2*

5 parts of 1,4-p-toluido-Bz-1-benzanthronylaminoanthraquinone, obtained by condensation of 1,4-aminotoluidoanthraquinone with Bz-1-halogen-benzanthrone or by condensation of 1,4-halogen-p-toluidoanthraquinone with Bz-1-aminobenzanthrone are treated with 30 parts of fuming sulphuric acid of 10% $SO_3$ and at 70–80° C., until a test shows that it became water-soluble. The isolated dyestuff dyes wool grey shades of excellent fastness.

Instead of fuming sulphuric acid one can also use a suitable quantity of chlorosulphonic acid.

*Example 3*

5 parts of 1,4-o-toluido-Bz,1-benzanthronylaminoanthraquinone are dissolved in presence of 2 parts of boric acid in 25 parts of sulphuric acid monohydrate and treated with fuming sulphuric acid at 40–90° C., until a sample became water-soluble.

The dyestuff thus obtained dyes wool grey shades.

Other starting materials such as 1,4-p-amidoacetanilido - Bz,1-benzanthronylaminoanthraquinone, 1,4-p-chloranilido-Bz,1-benzanthronylaminoanthraquinone, 1,4-m-chloranilido-Bz,1-benzanthronylaminoanthraquinone, 1,4-dichloranilido-Bz,1-benzanthronylaminoanthraquinone, 1,4-p-phenylenediamino - Bz,1- benzanthronylaminoanthraquinone, 1,4-p-amidodiphenyl-Bz,1-benzanthronylaminoanthraquinone, 1,4-xylidino-Bz,1-benzanthronylaminoanthraquinone, 1,4-mesidino-Bz,1 - benzanthronylaminoanthraquinone, 1,4-α or β-naphthylamino-Bz,1-benzanthronylaminoanthraquinone etc. also yield valuable dyestuffs when subjected to the above described method of sulphonation.

*Example 4*

5 parts of 1,5-p-toluido-Bz,1-benzanthronylaminoanthraquinone, obtained for example by condensation of 1,5-amino-p-toluidoanthraquinone with Bz,1-chlorobenzanthrone, are treated with 25 parts of fuming sulphuric acid of 10% $SO_3$ at 40–45° C., until a sample is soluble in water.

The dyestuff thus obtained dyes wool brown-red shades of excellent fastness properties.

Instead of the p-toluido-radical other derivatives containing aromatic or aliphatic amino radicals can be used, whereby on sulphonation valuable dyestuffs may be obtained.

*Example 5*

4 parts of 1,4-anilido-Bz,1-(6-bromobenzanthronylamino)anthraquinone obtained by condensation of 6-Bz,1-dibromobenzanthrone with 1,4-aminoanilidoanthraquinone are treated with 20 parts of fuming sulphuric acid at 70–100° C., until the starting product has become water-soluble.

The isolated dyestuff dyes wool grey shades.

*Example 6*

5 parts of 1,4-anilido-Bz,1-benzanthronylaminoanthraquinone are dissolved in 40 parts of fuming sulphuric acid of 12% $SO_3$, and after addition of 0.1 part of mercury oxide, stirred at 50° C., until a sample is completely water-soluble.

The obtained dyestuff dyes wool reddish-grey shades.

*Example 7*

5 parts of 1,Bz,1-benzanthronylaminoanthraquinone are dissolved in 35 parts of fuming sulphuric acid of 12% $SO_3$ and stirred at 20–40° C., until a sample is water-soluble.

The isolated dyestuff dyes wool yellow shades of good fastness properties.

*Example 8*

5 parts of 1,4-amino-Bz,1-benzanthronylaminoanthraquinone are dissolved in 25 parts of fuming sulphuric acid of 10 to 15% $SO_3$ in presence of 0.1 part of mercury oxide and heated at 60–80° C., until the mass has become water-soluble.

The dyestuff thus obtained dyes wool reddish-grey shades.

*Example 9*

5 parts of 1,5-amino-Bz,1-benzanthronylaminoanthraquinone, obtained by condensation of 1 molecule of Bz,1-halogen-benzanthrone with 1 molecule of 1,5-diaminoanthraquinone, are treated with 30 parts of fuming sulphuric acid of 12% $SO_3$ at 20–40° C., until the product has become water-soluble.

The isolated dyestuff dyes wool brownish-red shades.

*Example 10*

5 parts of 1,4-ethanolamino-Bz,1-benzanthronylaminoanthraquinone are dissolved in presence of 1 part of boric acid in 40 parts of fuming sulphuric acid of 10% $SO_3$ and stirred at 40–60° C., until the starting material has become water-soluble.

The isolated dyestuff dyes wool grey shades.

Example 11

20 parts of 1,4-anilido-Bz,1-benzanthronylaminoanthraquinone, 15 parts of anhydrous sodium sulphate and 150 parts of fuming sulphuric acid of 15% $SO_3$ are stirred together at 70° C., until a sample is completely soluble in water.

The isolated dyestuff dyes wool and leather dark grey shades.

Example 12

20 parts of 1,4-anilido-Bz,1-benzanthronylaminoanthraquinone are dissolved in 200 parts of fuming sulphuric acid of 15% $SO_3$ and stirred at 50–55° C., until a sample is soluble in water.

The isolated dyestuff dyes wool grey shades.

Example 13

20 parts of 1,4-anilido-Bz,1-benzanthronylaminoanthraquinone are dissolved in a mixture of 50 parts of sulphuric acid monohydrate and 30 parts of fuming sulphuric acid of 68% $SO_3$ and stirred several hours at 30° C., until a sample has become fully water-soluble.

The isolated dyestuff dyes wool reddish-grey shades.

Example 14

20 parts of 1,4-anilido-Bz,1-benzanthronylaminoanthraquinone are dissolved in 140 parts of fuming sulphuric acid of 20% $SO_3$ and stirred at room temperature, until a sample is soluble in water.

The isolated dyestuff dyes wool grey shades.

What I claim is:

1. The water-soluble dyestuffs of the general formula

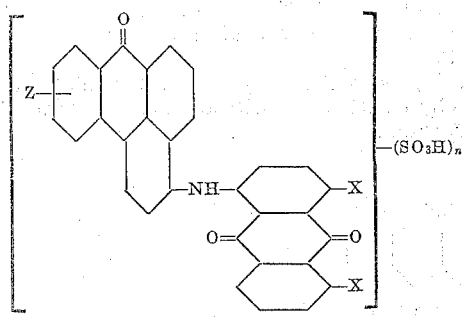

wherein $n$ is a whole number, Z is a member of the group consisting of hydrogen and halogen and one of the X's stands for a member of the group consisting of hydrogen, amino, alkylamino, hydroxyalkylamino and arylamino, the other X being hydrogen, said dyestuffs dyeing animal fibres yellow, orange, brown and grey shades.

2. The water-soluble dyestuffs of the general formula

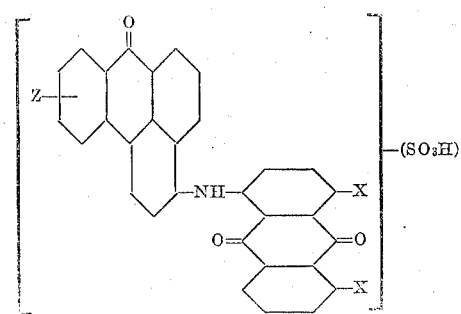

wherein $n$ is a whole number, Z is a member of the group consisting of hydrogen and halogen and one of the X's stands for an arylamino group, the other X being hydrogen, said dyestuffs dyeing animal fibres brown and grey shades.

3. The water-soluble dyestuffs of the general formula

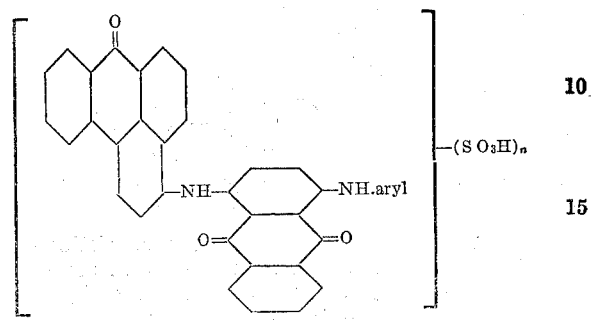

wherein $n$ is a whole number, said dyestuffs being soluble in concentrated sulphuric acid with a blue coloration and dyeing animal fibres grey shades.

4. The water-soluble dyestuffs of the formula

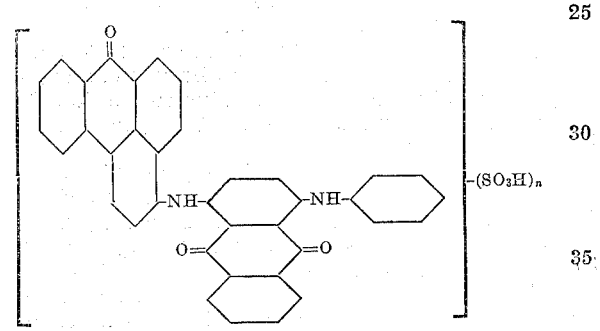

wherein $n$ is a whole number, which dyestuffs are soluble in concentrated sulphuric acid with a blue coloration and dye animal fibres grey shades.

5. The water-soluble dyestuffs of the formula

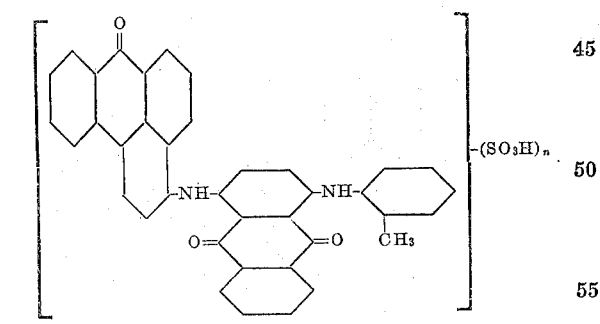

wherein $n$ is a whole number, which dyestuffs are soluble in concentrated sulphuric acid with a blue coloration and dye animal fibres grey shades.

6. The water-soluble dyestuffs of the formula

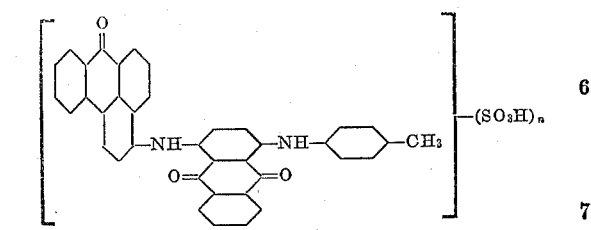

wherein $n$ is a whole number, which dyestuffs are soluble in concentrated sulphuric acid with a blue coloration and dye animal fibres grey shades.

7. A process for producing water-soluble dyestuffs by treating anthraquinone compounds of the general formula

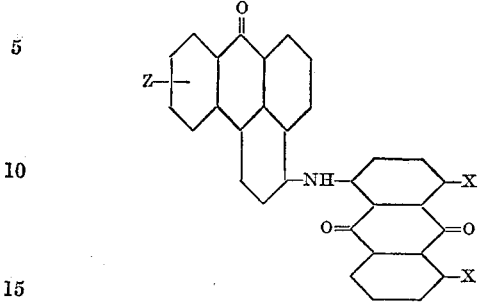

wherein Z is a member of the group consisting of hydrogen and halogen and one of the X's stands for a member of the group consisting of hydrogen, amino, alkylamino, hydroxyalkylamino and arylamino, the other X being hydrogen, with sulphonating agents at a temperature of 20–150° C.

8. A process for producing water soluble dyestuffs by treating the same anthraquinone compounds as in claim 7 with fuming sulphuric acid at a temperature of 20–150° C.

9. A process for producing water soluble dyestuffs by treating the same anthraquinone compounds as in claim 7 with fuming sulphuric acid at a temperature of 20–150° C. in presence of boric acid as a catalyst.

10. A process for producing water soluble dyestuffs by treating the same anthraquinone compounds as in claim 7 with fuming sulphuric acid at a temperature of 20–150° C. and in presence of a metal salt of sulphuric acid.

11. A process for producing water soluble dyestuffs by treating the same anthraquinone compounds as in claim 7 with fuming sulphuric acid at a temperature below 100° C. and in presence of anhydrous sodium sulphate.

12. A process for producing water soluble dyestuffs by treating anthraquinone compounds of the general formula

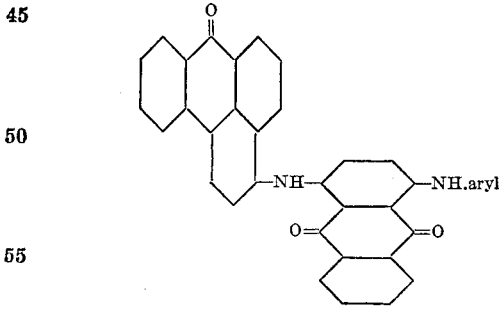

with fuming sulphuric acid in presence of anhydrous sodium sulphate, at a temperature below 100° C.

13. A process for producing water soluble dyestuffs by treating an anthraquinone compound of the formula

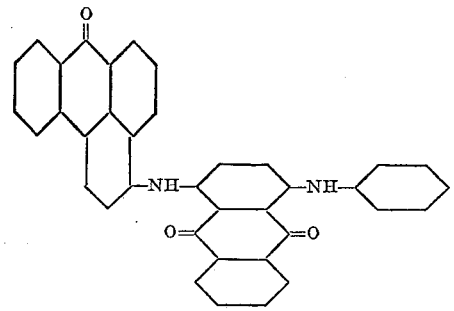

with fuming sulphuric acid in presence of anhydrous sodium sulphate at a temperature below 100° C.

14. A process for producing water-soluble dyestuffs by treating an anthraquinone compound of the formula

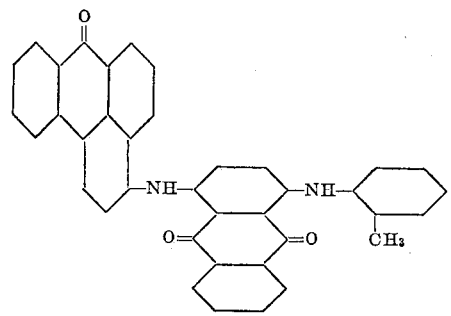

with fuming sulphuric acid in presence of anhydrous sodium sulphate at a temperature below 100° C.

15. A process for producing water-soluble dyestuffs by treating an anthraquinone compound of the formula

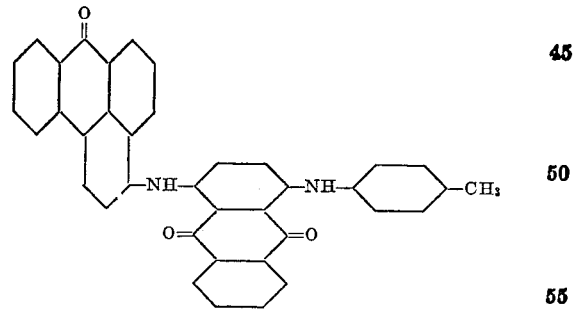

with fuming sulphuric acid in presence of anhydrous sodium sulphate at a temperature below 100° C.

ERNST GUTZWILLER.